United States Patent [19]

Takeyama

[11] Patent Number: 5,095,315
[45] Date of Patent: Mar. 10, 1992

[54] MULTIPOINT SYNCHRONIZATION OPTICAL WRITING APPARATUS

[75] Inventor: Yoshinobu Takeyama, Kawasaki, Japan

[73] Assignee: Ricoh Company, Ltd., Tokyo, Japan

[21] Appl. No.: 568,718

[22] Filed: Aug. 17, 1990

[30] Foreign Application Priority Data

Aug. 21, 1989 [JP] Japan .................................. 1-214567
Aug. 21, 1989 [JP] Japan .................................. 1-214568
Sep. 4, 1989 [JP] Japan .................................. 1-228594

[51] Int. Cl.$^5$ ........................... G01D 9/42; H04N 1/23
[52] U.S. Cl. ............................................................ 346/108
[58] Field of Search ............ 346/108, 111, 160, 153.1, 346/150; 358/296, 300, 302, 409, 481

[56] References Cited

U.S. PATENT DOCUMENTS 4,962,431 10/1990 Imakawa et al. ................ 346/108 X
4,975,650 12/1990 Martin ................................ 328/155 X
4,978,976 12/1990 Okino ................................ 346/108

FOREIGN PATENT DOCUMENTS 54-97050 7/1979 Japan .

Primary Examiner—R. L. Moses
Attorney, Agent, or Firm—Oblon, Spivak, McClelland, Maier & Neustadt

[57] ABSTRACT

A multipoint synchronization optical writing apparatus which carries out an optical writing through modulation of a writing beam from a first light source in accordance with image information, the modulation of the writing beam being made in synchronism with a picture element clock signal supplied based on a synchronizing beam from a second light source. The apparatus comprises a reference signal generation circuit for generating a reference signal based on the synchronizing beam, the reference signal covering the overall width of a main scanning made with the writing beam, a phase lock loop circuit for generating the picture element clock signal having a phase in synchronism with a phase of the reference signal, a phase difference detection circuit for detecting a change in a phase difference between a write set signal and the picture element clock signal to generate a control signal having a voltage proportional to the phase difference change detected, and a reference signal processing circuit for varying a duty factor of the reference signal depending on the control signal and for supplying the reference signal having the varied duty factor to the phase lock loop circuit.

10 Claims, 7 Drawing Sheets

MULTIPOINT SYNCHRONIZATION OPTICAL WRITING APPARATUS

BACKGROUND OF THE INVENTION

The present invention generally relates to optical writing apparatus, and more particularly to a multipoint synchronization optical writing apparatus which is applied to high quality laser beam printers and laser plotters.

Generally, in an optical writing apparatus of, for example, a laser beam printer, a writing beam emitted from a laser light source is modulated in accordance with image information, and this writing beam is deflected by a deflector unit, for example, a rotary polygonal mirror, to scan the deflected light over a surface of a photosensitive body where an optical writing of the image information is carried out. However, it is quite difficult to rotate the rotary polygonal mirror at a substantially constant speed, and there are usually variations of rotating speed when the rotary polygonal mirror is driven. Actually, such speed variations lead to irregular pitches of scanning dots on the surface of the photosensitive body. For achieving good positioning accuracy of optical writing dots with regular pitches of the scanning dots, U.S. Pat. No. 3,389,403 discloses a conventional optical writing apparatus of a multipoint synchronization type which uses a linear encoder having a plurality of slits for supplying a multipoint synchronizing signal to control the modulation of the writing beam. But it is difficult to manufacture such a conventional linear encoder product having a greater number of slits for providing a very fine resolution.

There is also a conventional multipoint synchronization optical writing apparatus, as disclosed in Japanese Published Patent Application No. 54-97050, which discloses some improvements of the above discussed optical writing apparatus, one of the improvements being to facilitate the manufacture of the linear encoder that provides a finer resolution. In this conventional multipoint synchronization optical writing apparatus, a video clock, or a picture element clock signal, is produced by dividing a pulse repetition rate of a photoelectrically converted signal, sent from the linear encoder, by n. More specifically, a phase detector (PD) of a phase lock loop (PLL) circuit compares the photoelectrically converted signal obtained from the linear encoder with a predetermined reference signal, and a feedback control of a phase of a signal from a voltage controlled oscillator is carried out so that both the phases of these signals accord with each other. The PLL circuit provides the laser light source with a synchronizing signal for controlling the modulation of the laser light source, the synchronizing signal being in synchronism with the photoelectrically converted signal and obtained by dividing the pulse repetition rate of the photoelectrically converted signal by n. The PLL circuit usually shows a certain degree of response time delay owing to the circuit structure. Immediately after the photoelectrically converted signal is generated, the phase of the photoelectrically converted signal normally does not accord with the phase of the reference signal, and this time period required for phase coincidence is called a lockup time. In the above discussed conventional optical writing apparatus, after the lockup time of the PLL circuit elapses and the phases of the signals accord with each other, a gate circuit is turned ON to allow the PLL circuit to first output a write set signal that starts to send a picture element clock signal. A well controlled modulation of the writing beam from the laser light source in synchronism with this picture element clock signal allows each starting point of effective scanning lines on the photosensitive body to be aligned accurately in a vertical scanning direction, ensuring a desired accuracy for writing dot positions. In general, the shorter the above discussed lockup time of the PLL circuit is, the longer the effective scanning line is. A longer effective scanning line is advantageous for obtaining a fine resolution from an optical writing apparatus. In this regard, the above discussed optical writing apparatus uses the first pulse of the photoelectrically converted signal to reset a divider for dividing of the pulse repetition rate of the photoelectrically converted signal to a turned-off state. This resetting of the divider causes the phase of the photoelectrically converted signal to accord with that of the reference signal, thereby reducing the amount of phase compensation and shortening the lockup time of the PLL circuit.

However, it is only within a limited range of ambient temperature that the above discussed conventional optical writing apparatus can accurately position writing dots on the photosensitive body. Once the ambient temperature changes greatly, the PLL circuit often shows, even when the phase is locked, a great change in phase difference between the reference signal and the clock signal. The clock signal is provided by dividing the pulse repetition rate of the output signal supplied from the PLL circuit as a feedback signal. Therefore, even if a phase difference between the write set signal (in synchronism with the reference signal) and the writing clock signal (the picture element clock signal) at a normal temperature is correctly adjusted, the phase difference between the write set signal and the write clock signal is increased when the ambient temperature changes significantly. This may result in writing dots being placed at undesired positions of an image forming surface. In other words, in the case of the conventional optical writing apparatus, there is no effective measure for compensating for such a change in phase difference when the ambient temperature changes.

In addition, since the reference signal occurs intermittently, an input voltage to the voltage controlled oscillator fluctuates when such an intermittent reference signal occurs. This makes a ripple of the input voltage become large, and there is an undesired response delay of the PLL circuit to function in step with the synchronization.

SUMMARY OF THE INVENTION

Accordingly, it is a general object of the present invention to provide a novel and useful multipoint synchronization optical writing apparatus in which the above described problems are eliminated.

Another and more specific object of the present invention is to provide a multipoint synchronization optical writing apparatus which comprises a reference signal generation circuit for generating a reference signal based on a synchronizing beam from a second light source, the reference signal covering the overall width of a main scanning made with a writing beam from a first light source, a phase lock loop circuit for generating a picture element clock signal having a phase in synchronism with a phase of the reference signal sent from the reference signal generation circuit, a phase difference detection circuit for detecting a change in a phase difference between a write set signal and the picture element clock signal sent from the phase lock loop circuit, said phase difference detection circuit generating a control signal having a voltage proportional to said change in said phase difference, and a reference signal processing circuit for varying a duty factor of the reference signal depending on the control signal supplied from the phase difference detection circuit, said reference signal processing circuit supplying the reference signal having the thus varied duty factor to the phase lock loop circuit. According to the present invention, it is possible that the PLL circuit operates so as to reduce the detected change in the phase difference between the reference signal and the picture element clock signal, thereby ensuring the reduction of the change in the phase difference between the write set signal and the picture element clock signal, because the phase of the write set signal is synchronous with that of the reference signal. Thus, it is possible to provide good accuracy of writing dot positions by reducing the change in the phase difference due to the ambient temperature change.

Still another object of the present invention is to provide a multipoint synchronization optical writing apparatus which comprises a reference signal generation circuit for generating a reference signal based on a synchronizing beam from a second light source, the reference signal covering the overall width of a main scanning made with a writing beam from a first light source, a phase lock loop circuit for generating the picture element clock signal having a phase in synchronism with a phase of the reference signal sent from the reference signal generation circuit, a phase difference detection circuit for detecting a change in a phase difference between a write set signal and the picture element clock signal sent from the phase lock loop circuit, the phase difference detection circuit comprising an up/down counter for counting the number of pulses of the picture element clock signal that are proportional to the change in the phase difference, the up/down counter supplying a first control signal indicative of the number of the pulses, and a phase shift signal generation circuit for generating a second control signal having a voltage in accordance with the first control signal supplied from the up/down counter of the phase difference detection circuit to the phase shift signal generation circuit, the phase shift signal generation circuit supplying the second control signal to the phase lock loop circuit. According to the present invention, it is possible that by using the phase shift signal the PLL circuit operates so as to reduce the detected change in the phase difference between the write set signal and the picture element clock signal, thereby providing good accuracy of writing dot positions regardless of whether or not the change in the phase difference takes place due to the ambient temperature change.

Further object of the present invention is to provide a multipoint synchronization optical writing apparatus which comprises a reference signal generation circuit for generating a reference signal based on a synchronizing beam from a second light source, the reference signal covering the overall width of a main scanning made with a writing beam from a first light source, a phase lock loop circuit for generating a picture element clock signal having a phase in synchronism with a phase of the reference signal sent from the reference signal generation circuit, the phase lock loop circuit comprising a voltage controlled oscillator, a phase detector, a divider and a low pass filter, a counter circuit for counting a predetermined number of pulses of the reference signal supplied from the reference signal generation circuit, and a write set signal generating circuit for generating a write set signal in synchronism with a generation of a feedback signal supplied from the divider of the phase lock loop circuit to the phase detector, the feedback signal having a divided pulse repetition rate that is determined from an output of the voltage controlled oscillator when the prescribed number of the pulses counted by the counter circuit is reached. According to the present invention, it is possible to prevent the misalignment of the writing dots even when the ambient temperature changes greatly. And, it is possible to shorten remarkably the lockup time of the PLL circuit by reducing a fluctuation or a ripple that often appears in the input voltage of the voltage controlled oscillator with the reference signal being intermittently turned on and off.

Other objects and further features of the present invention will be apparent from the following detailed description when read in conjunction with the accompanying drawings.

DESCRIPTION OF THE PREFERRED EMBODIMENTS

First, a description will be given of a first embodiment of a multipoint synchronization optical writing apparatus according to the present invention, which may be applied to a laser beam printer, by referring to FIGS. 1 and 2.

Figure 2:
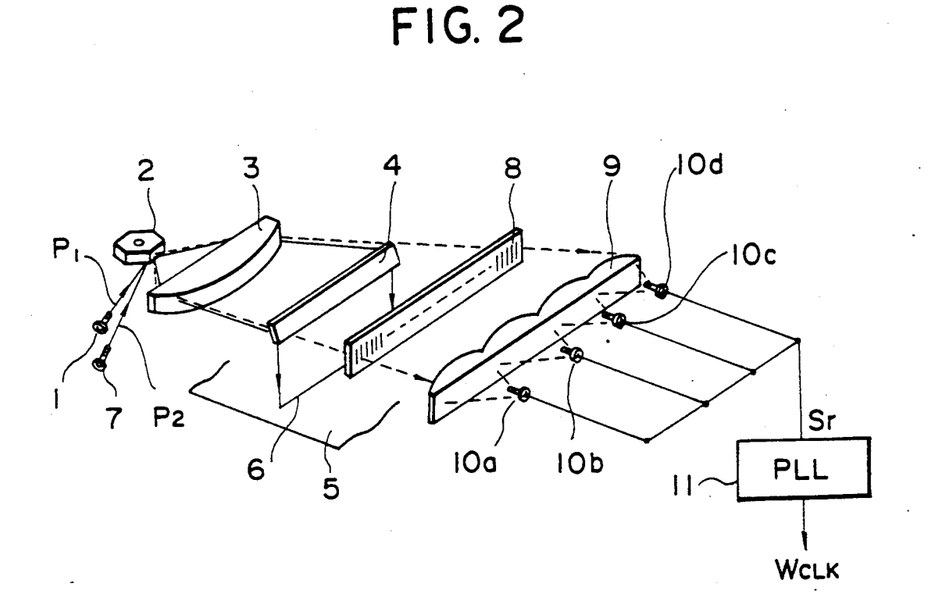
FIG. 2 is a perspective view of the multipoint synchronization optical writing apparatus used in a laser beam printer.

FIG. 2 is a perspective view of a multipoint synchronization optical writing apparatus that uses a grating with a number of slits, which is applied to a laser beam printer. This laser beam printer is disclosed, for example, in Japanese Published Patent Application No. 60-72473. The grating is used for generating a picture element clock signal. In FIG. 2, there are provided a first laser diode 1 for emitting a writing light beam P1 and a second laser diode 7 for emitting a synchronizing light beam P2. The writing light beam P1 from the first laser diode 1 is deflected on a surface of a rotary polygonal mirror 2 at a first incident point thereon, and this deflected light passes through a fθ lens 3 and is reflected by a mirror 4 so that a light is scanned on a photosensitive body 5 in a main scanning direction due to a rotation of the rotary polygonal mirror 2 around a rotation axis thereof to record information thereon. This recording is made along a main scanning line 6 on the photosensitive body 5.

The synchronizing light beam P2 from the laser diode 7 is also deflected on the same surface of the rotary polygonal mirror 2, where the writing light beam P1 is applied, at a second incident point that is distant from the first incident point in an axial direction of the rotary polygonal mirror 2 but is at the same location as the first incident point relative to the main scanning direction, or a direction of the main scanning line 6. As in the case of the writing light beam P1, the synchronizing light beam P2 being deflected by the rotary polygonal mirror 2 passes through the fθ lens 3 but goes over the mirror 4, as indicated by a dotted line in FIG. 2, due to the difference between the incident points as discussed above. The grating 8 is located at a position that is optically equivalent to a position of the photosensitive body 5 relative to the mirror 4. The synchronizing beam P2 is scanned in the main scanning direction on the grating 8 having opaque areas and transparent areas owing to the number of the slits, and this scanned light passes through the transparent areas of the grating 8 and enters a lens array 9 having a number of lens portions, so that a focusing light is supplied to a plurality of light receiving elements, for example, four light receiving elements 10a, 10b, 10c and 10d, in this order, which photoelectrically convert a received light into an electric signal. These light receiving elements sequentially supply a reference signal Sr including a train of two-level pulses generated based on the photoelectrically converted signal, to a phase lock loop (PPL) circuit 11. More specifically, each of the photoelectrically converted signals sent from the light receiving elements 10a, 10b, 10c and 10d is sequentially amplified, and such amplified signals are supplied to an adder circuit which sums up these converted signals, and the output of the adder circuit is converted into two-level pulses having a high level and a low level, the two levels of the two-level pulses being determined by a comparison with a predetermined threshold voltage. Thus, the reference signal Sr has a train of two-level pulses that are in accordance with the transparent and opaque areas of the grating 8, which cover the width of the main scanning of the light beam P1 in the main scanning direction. As required, a waveform shaping is performed. This reference signal Sr is then supplied to the PPL circuit 11, which divides a pulse repetition rate of an incoming signal and generates a picture element clock signal Wclk that is used for modulation of the writing beam in synchronism with this picture element clock signal Wclk.

Figure 1:
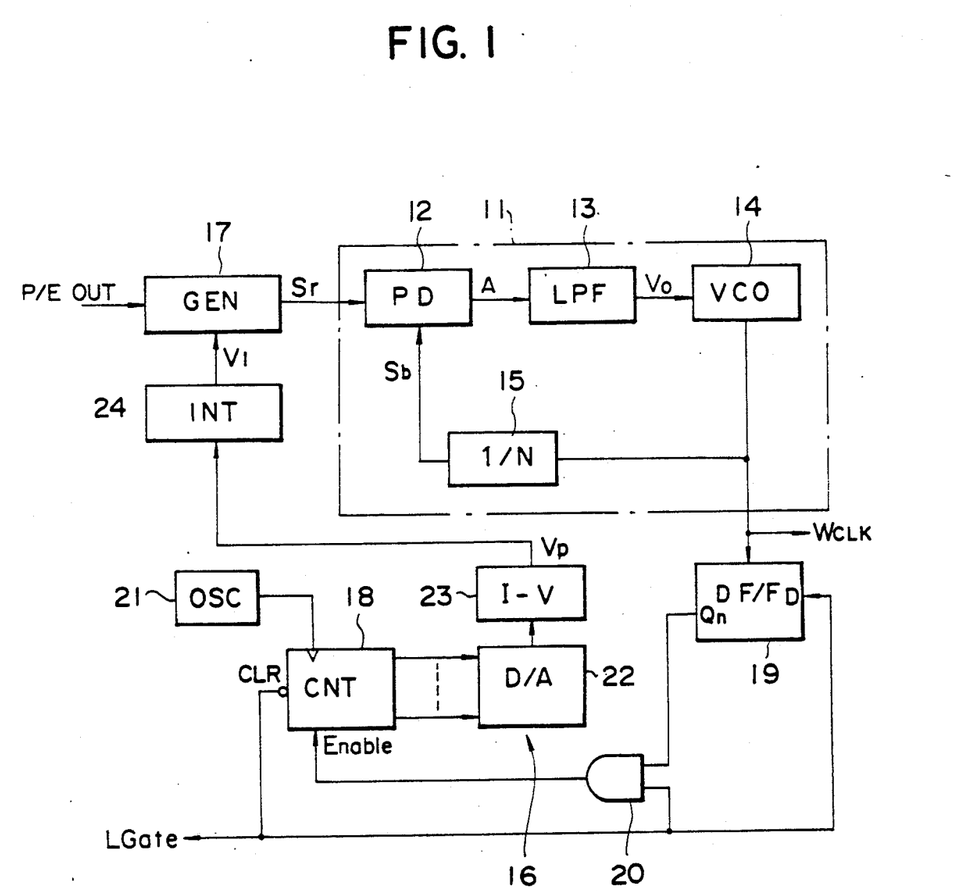
FIG. 1 is a block diagram for explaining a first embodiment of a multipoint synchronization optical writing apparatus according to the present invention.
Figure 3:
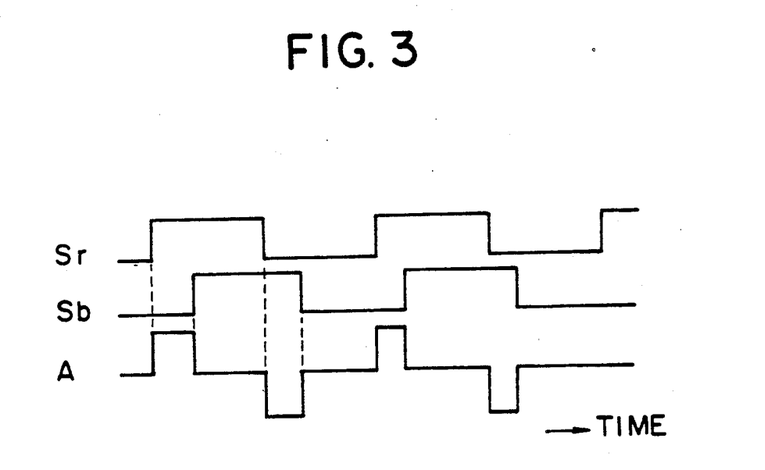
FIG. 3 is a timing chart for explaining an operation of a phase detector used in the multipoint synchronization optical writing apparatus.

As shown in FIG. 1 in more detail, the PLL circuit 11 comprises a phase detector (PD) 12, a low pass filter (LPF) 13, a voltage controlled oscillator (VCO) 14 and a divider (1/N) 15. An output of the voltage controlled oscillator 14 is sent back to the divider 15, and the divider 15 supplies a feedback signal Sb obtained from the output of the VCO 14 divided by n to the phase detector 12. The phase detector 12 compares the feedback signal Sb with the reference signal Sr and supplies an output A responsive to a phase error or phase difference between the feedback signal Sb and the reference signal Sr. This output A of the PD 12 is shown in FIG. 3, and a waveform of such output signal is smoothened by the LPF 13, when the LPF 13 supplies a control voltage Vo to the VCO 14. Thus, the VCO 14 is controlled so as to supply an output that ensures synchronism of the phase of the feedback signal Sb with that of the reference signal Sr, so that the PLL circuit 11 sends the picture element clock signal Wclk to a drive circuit which drives the laser diode 1 through modulation. When the phase error between the feedback signal Sb and the reference signal Sr changes as indicated in FIG. 3, the PLL circuit 11 serves to reduce such a change in phase error by changing the control voltage Vo sent to the VCO 14.

In this first embodiment of the present invention, the PLL circuit 11 is provided with a phase error change compensation circuit which makes up for a change in phase error between the write set signal and the picture element clock signal Wclk due to the change in ambient temperature, by changing the duty factor of the reference signal Sr, in other words, varying appropriately the pulse width of the output of the phase detector 12. A description will now be given of the phase error change compensation circuit according to the present invention.

As shown in FIG. 1, this phase error change compensation circuit generally has a phase difference detection circuit 16 and a reference pulse generator circuit 17. The phase difference detection circuit 16 comprises a counter (CNT) 18, a D flip-flop (D F/F) 19, an AND gate 20, an oscillator (OSC) 21, a digital-to-analog converter (D/A) 22 and a current-voltage converter (I-V) 23, and this phase difference detection circuit 16 is provided to detect a change in phase difference between the write set signal L/GATE and the picture element clock signal Wclk. The write set signal L/GATE is a signal used for modulation of the writing beam from the first laser diode 1 to start writing in the main scanning direction, this signal being generated in synchronism with the reference signal Sr. The counter 18 is cleared when the write set signal L/GATE is turned to a low level from a high level. The picture element clock signal Wclk from the VCO 14 is inputted to a clock terminal of the D flip-flop 19, and the write set signal L/GATE is inputted to a D terminal of the D flip-flop 19. An inverted Q output from a Qn terminal of the D flip-flop 19, as well as the write set signal L/GATE, is supplied to the AND gate 20, so that the above described counter 18 is set in an enable state for a period of time corresponding to a phase difference between the rise of the write set signal L/GATE and the rise of the picture element clock signal Wclk. This counter 18, during the enable state, counts the number of transmitted pulses from the oscillator 21 and holds the number of the pulses. The digital-to-analog (D/A) converter 22 is connected to an output terminal of the counter 21, and the counted value from the counter 18 is supplied to the D/A converter 22 which converts the counted value into an analog value. The current-voltage converter 23 is connected to a output terminal of the D/A converter 22, and this current-voltage converter 23 generates a control voltage Vp from the analog value from the D/A converter 22, the control voltage Vp corresponding to the phase difference between the rise of the write set signal L/GATE and the rise of the picture element clock signal Wclk.

Figure 4:
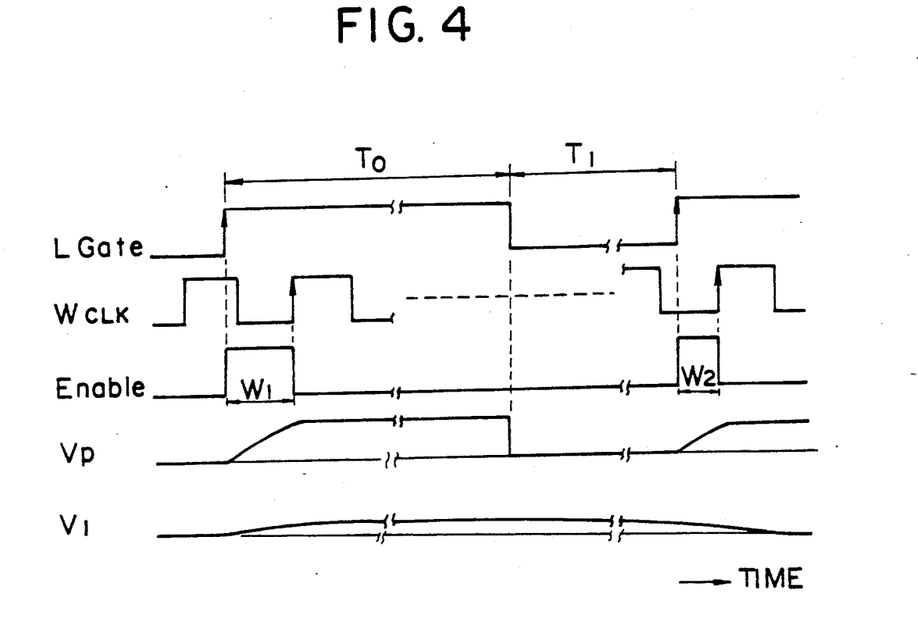
FIG. 4 is a timing chart for explaining an operation of the multipoint synchronization optical writing apparatus.

On an output side of the current-voltage converter 23, an integration circuit 24 is provided for smoothening pulses of the control voltage Vp from the current-voltage converter 23 to supply a control voltage V1. This integration circuit 24 has a time constant that is greater than a blanking time period T1 which is substantially equal to an output time period T0 for which the write set signal L/GATE is continuously outputted as indicated in FIG. 4. The reference pulse generation circuit 17 is connected to the integration circuit 24, and this reference pulse generation circuit 17 provides the phase detector 12 of the PLL circuit 11 with the reference signal Sr processed through the photoelectrically converted signals sent from the light receiving elements 10, the reference signal Sr having a duty factor that is varied in accordance with the control voltage V1 from the integration circuit 24. More specifically, in accordance with the above discussed control voltage V1, the reference pulse generation circuit 17 varies a threshold voltage Th that is determined as being a reference level on which the reference signal Sr including the two-level pulses supplied from the reference pulse generator 17 is based. With the above described PLL circuit 11 at a normal temperature (room temperature), a gain and a threshold voltage Th of this circuit are adjusted so that the PLL circuit 11 in its phase locked condition provides a phase difference of 180 degrees (half a period of picture element clock signal Wclk) between the rise of the write set signal L/GATE and the rise of the picture element clock signal Wclk. At this setting, W0, Th0 and Sr0 denote a pulse width of the enable signal, a threshold voltage and a reference signal Sr, respectively.

Figure 5:
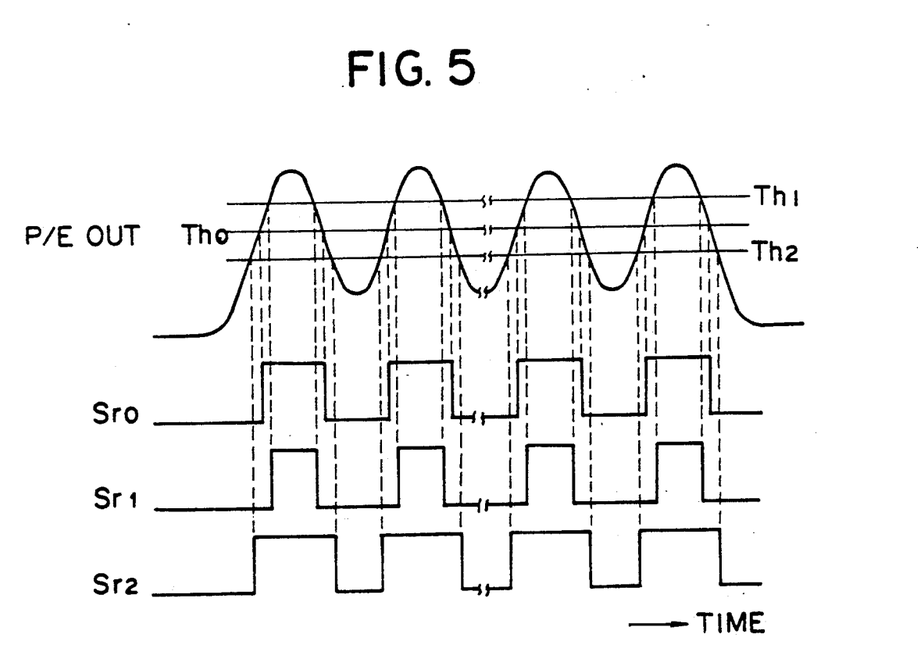
FIG. 5 is a timing chart for explaining a generation of a reference signal by comparison of a photoelectrically converted signal with a threshold voltage.

With the write set signal L/GATE being turned from the low level to the high level, the counter 18 is set in an enable state, then this counter 18 starts to count the number of the pulses which are transmitted from the oscillator 21. This action of the counter 18 is stopped in synchronism with a rise of the picture element clock signal Wclk (from the low level to the high level) immediately after the fall of the write set signal L/GATE (the low level) is detected, but the number of the pulses counted by the counter 18 is held until the write set signal L/GATE comes to the next fall timing. The number of the pulses counted by the counter 18 is given as a digital signal proportional to a phase difference between the rise of the write set signal L/GATE and the rise of the picture element clock signal Wclk, and this digital signal of this counted number is converted into an analog signal by the D/A converter 22. From this analog signal, the current-voltage converter 23 generates a control voltage Vp, and this control voltage Vp is supplied to the integration circuit 24. The integration circuit 24 integrates and smoothens a signal waveform of the control voltage Vp into a signal of a control voltage V1 which is supplied to the reference pulse generation circuit 17. The reference pulse generation circuit 17 varies the threshold voltage Th depending on the level of the control voltage V1 supplied from the integration circuit 24. If a pulse width W of the enable signal in this condition remains unchanged (W=W0), the threshold voltage Th is equal to the initial threshold voltage Th0 as shown in FIG. 5. The pulse width W is proportional to the phase difference described above. And, the reference signal Sr supplied from the reference pulse generation circuit 17 to the PLL circuit 11 in this case is equal to the initial reference signal Sr0 as indicated in FIG. 5.

A case will now be considered where the phase difference between the rise of the write set signal L/GATE and the rise of the picture element clock signal Wclk becomes greater than the initial phase difference of 180 degrees at a normal temperature when the ambient temperature changes significantly. The pulse width W of the enable signal proportional to the above described phase difference is also increased to W1 (W1>W0), and both the number of the pulses counted and the control voltage Vp from the phase difference detection circuit 16 are increased to a greater level than at normal temperature. At the fall of the write set signal L/GATE (the low level), the control voltage Vp is cleared to 0 V, as shown in FIG. 4, but the control voltage Vp is maintained by the integration circuit 24 which has a time constant greater than the blanking time T1 of the write set signal L/GATE until the next rise of the write set signal L/GATE takes place. Accordingly, the threshold voltage Th of the reference pulse generation circuit 17 in this case changes from Th0 to Th1, (Th1>Th0) depending on the control voltage V1 from the integration circuit 24. This allows the reference signal Sr being inputted to the PLL circuit 11 to change from Sr0 to Sr1, as shown in FIG. 5. As shown in FIG. 5, this reference signal Sr1 has a duty factor smaller than that of the reference signal Sr0 at normal temperature. Then, the PLL circuit 11 operates so as to synchronize the phase of the feedback signal Sb with the phase of the reference signal Sr1 as discussed above. In this case, the write set signal L/GATE is synchronous with the reference signal Sr1 and the picture element clock signal Wclk has a phase corresponding to that of the feedback signal Sb, and therefore the operation of the PLL circuit 11 allows the pulse width proportional to the increased phase difference between the write set signal L/GATE and the picture element clock signal Wclk to change from W1 to W0, thereby eliminating the change in phase difference due to the change in ambient temperature.

Another case will now be considered where the phase difference between the rise of the write set signal L/GATE and the rise of the picture element clock signal Wclk becomes smaller than 180 degrees at normal temperature when the ambient temperature changes significantly. And, the pulse width W, proportional to the above described phase difference changes from W0 to W2, as indicated in FIG. 4, the number of the pulses counted from the counter 18 and the control voltage Vp from the phase difference detection circuit 16 respectively become lower than those at normal temperature. Thus, in accordance with a lower level of the control voltage V1 supplied from the integration circuit 24 to the reference pulse generation circuit 17 based on such a lower level of the control voltage Vp, the threshold voltage Th of the reference pulse generation circuit 17 changes from Th0 to Th2 (Th2<Th0). This allows the reference signal Sr supplied to the PLL circuit 11 to change from Sr0 to Sr2, as shown in FIG.

5. As indicated in this drawing, the reference signal Sr2 has a duty cycle greater than that of the reference signal Sr0 at normal temperature. Similarly, the PLL circuit 11 operates so as to allow the pulse width proportional to the decreased phase difference between the write set signal L/GATE and the picture element clock signal Wclk to change from W2 to W0, thereby eliminating the change in the phase difference due to the ambient temperature change.

Figure 6:
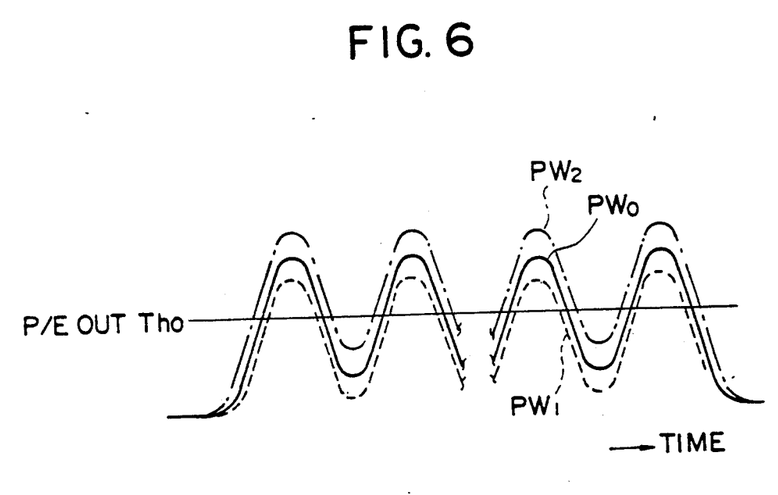
FIG. 6 is a waveform chart for explaining an operation of a modified example of the multipoint synchronization optical writing apparatus.

In these operations for phase difference compensation, the changes in duty factor of the reference signal Sr are negligible and the threshold voltage Th varies gradually, and therefore it is unlikely that the PLL circuit 11 will have the phase unlocked. And, the reference signal Sr corresponds to that obtained from the picture element clock signal Wclk divided by N by the divider, and a very small change of the duty factor of the reference signal Sr covers a relatively wide range of the phase change of the picture element clock signal Wclk. In addition, it is possible to use some other conceivable methods for providing a varying duty factor of the reference signal Sr being supplied to the phase detector 12, instead of the threshold voltage changing method described above. One of these modified methods, for example, is to vary a driving power to drive the second laser diode 7 for generating the synchronizing beam P2, responsive to a control signal Vp which is fed back to a drive circuit of the second laser diode 7. FIG. 6 shows a waveform diagram of a driving power signal used in such a modified example of the multipoint synchronization writing apparatus according to the present invention. In FIG. 6, PW0, PW1 and PW2 respectively denote a driving power of the driving circuit used at normal temperature, at a first changed temperature and at a second changed temperature. Those corresponding photoelectrically converted outputs occurring when the driving powers PW0, PW1 and PW2 are applied are as indicated by a solid line, a dotted line and a one-dot dash line in FIG. 6, respectively. By comparing these outputs with a fixed threshold voltage Th, the reference signal Sr including a train of two-level pulses being supplied to the PLL circuit 11 is varied to Sr0, Sr1 and Sr2, which respectively have those corresponding duty factors as indicated in FIG. 5.

Figure 7:
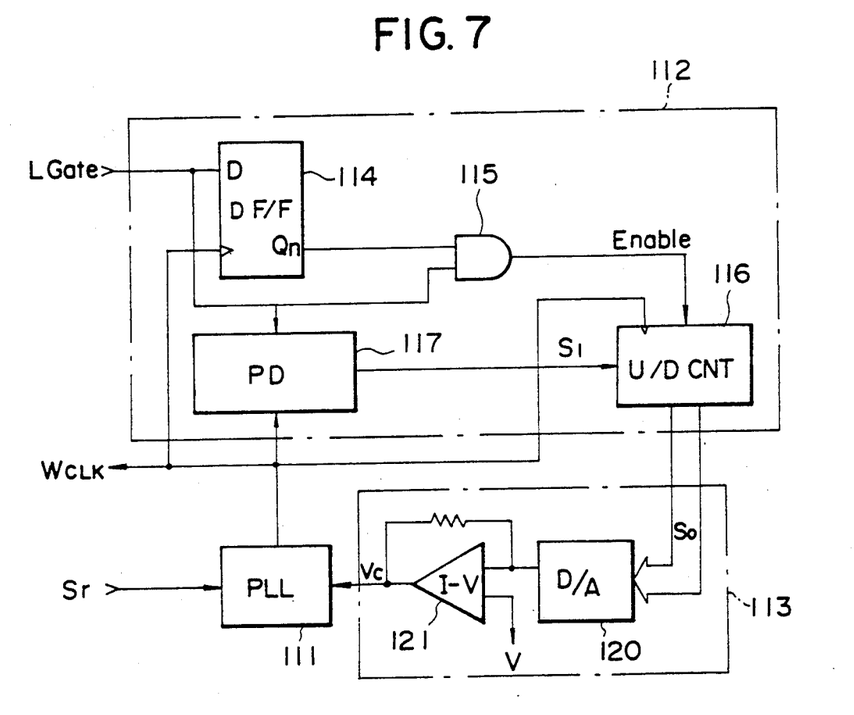
FIG. 7 is a block diagram showing a second embodiment of a multipoint synchronization optical writing apparatus according to the present invention.

Next, a description will be given of a second embodiment of a multipoint synchronization optical writing apparatus according to the present invention, by referring to FIG. 7. In this second embodiment, the above described PLL circuit is provided with a phase difference change compensation circuit. This phase difference change compensation circuit generally has a phase difference detection circuit 112 and a phase shift signal generation circuit 113. The phase difference detection circuit 112 is provided for detecting a change in a phase difference between the write set signal L/GATE of the main scanning and the picture element clock signal Wclk. The write set signal L/GATE of the main scanning is synchronous with the reference signal Sr.

In the phase difference detection circuit 112, a D flip-flop 114 having a clock input terminal, a D input terminal and a Qn output terminal is provided. The picture element clock signal Wclk from a voltage controlled oscillator (VCO) of a phase lock loop (PLL) circuit 111 is supplied to the clock input terminal of the D flip-flop 114, and the write set signal L/GATE is supplied to the D input terminal of the D flip-flop 114. A NOT Q output from the Qn terminal of the D flip-flop 114 is supplied to one terminal of an AND gate 115.

The write set signal L/GATE is also supplied to the other terminal of the AND gate 115. An output of this AND gate 115 allows an up/down counter 116 to be set in an enabled state for a time period proportional to a phase difference between a rise of the write set signal L/GATE and a rise of the picture element clock signal Wclk. The up/down counter 116, during the enabled state, counts the number of pulses of the picture element clock signal wclk supplied from the PLL circuit 111 and holds such a number of the pulses counted for a certain time period. The up/down counter 116 performs either a count-up operation or a count-down operation, and these operations of the up/down counter 116 are controlled by a control signal S1 which is supplied from a phase detector 117 to the up/down counter 116.

Figure 8:
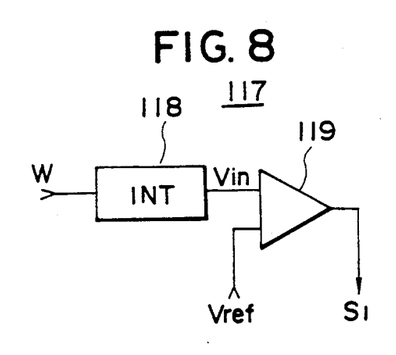
FIG. 8 is a block diagram of a phase detector used in the multipoint synchronization optical writing apparatus.
Figure 9:
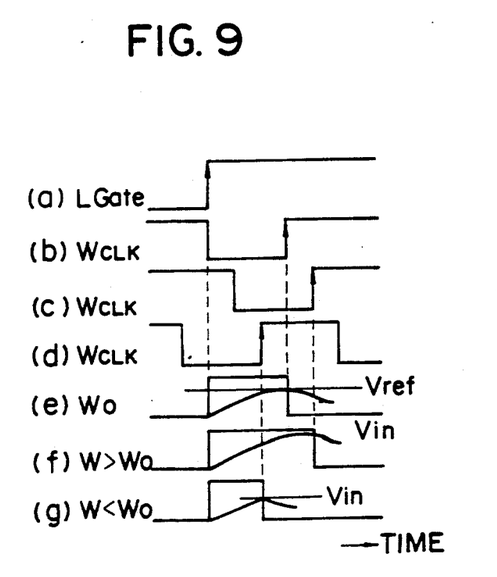
FIG. 9 is a timing chart for explaining an operation of the multipoint synchronization optical writing apparatus.

As shown in FIG. 8, the phase detector 117 comprises an integration circuit 118 and a voltage comparator 119. The phase detector 117 is provided for detecting a pulse width W proportional to the phase difference between the rise of the write set signal L/GATE and the rise of the picture element clock signal Wclk. The integration circuit 118 is provided for supplying a voltage Vin in accordance with the pulse width W. The voltage comparator 119 is provided to compare the voltage Vin from the integration circuit 118 with a reference voltage Vref and supply an output signal S1 indicative of whether the voltage Vin is greater than the reference voltage Vref or not. The reference voltage Vref is predetermined to show an initial pulse width W0 proportional to the phase difference between the picture element clock signal Wclk and the write set signal L/GATE at a normal temperature when there is no change in phase difference. FIG. 9 shows timing charts of these signals for explaining a operation of the second embodiment of the multipoint synchronization optical writing apparatus according to the present invention. As indicated in FIG. 9 (c) and (f), when the pulse width W indicative of the phase difference between the picture element clock signal Wclk and the write set signal L/GATE is greater that the initial pulse width W0 shown in FIG. 9 (b) and (e) (W>W0), the control signal S1 allows the up/down counter 116 to carry out a count-up operation. On the other hand, the control signal S1 allows the up/down counter 116 to carry out a count-down operation when the pulse width W is smaller than the initial pulse width W0 (W<W0), as shown in FIG. 9 (d) and (g). An output signal S0 of the up/down counter 116 indicative of either the count-up operation or the count-down operation to be made by the up/down counter 116 is supplied to the phase shift signal generation circuit 113.

The phase shift signal generation circuit 113 is provided to supply a control voltage Vc to the PLL circuit 111 based on the output signal S0 of the up/down counter 116 supplied from the above described phase difference detection circuit 112. As shown in FIG. 7, the phase shift signal generation circuit 113 generally has a digital-to-analog (D/A) converter 120 and a current-voltage (I-V) converter 121. The D/A converter 120 converts the output signal S0 supplied from the up/down counter 116 into an analog signal. The current-voltage converter 121 converts the analog signal sent from the D/A converter 120 into the control voltage Vc to be supplied to the PLL circuit 111. This control voltage Vc as a phase shift signal is supplied to the VCO constituting a part of the PLL circuit 111, the control voltage Vc serving as an offset signal to be sent to the VCO. In other words, the control voltage Vc allows the PLL circuit 111 to operate in order to adjust a loop gain of the PLL circuit 111 and maintain the initial pulse width W0 showing the initial phase difference at normal temperature as much as possible. As indicated in FIG. 9 (c) and (f), when the pulse width W showing the phase difference between the write set signal L/GATE and the picture element clock signal Wclk becomes greater than the initial pulse width W0 indicating the initial phase difference at a normal temperature (W>W0) due to the ambient temperature change, the up/down counter 116 carries out the count-up operation, allowing the control voltage Vc to increase so that the phase difference is made smaller by the operation of the PLL circuit 111 to maintain a substantially constant phase difference. On the other hand, as indicated in FIG. 9 (d) and (g), when the pulse width W becomes smaller than the initial pulse width W0 (W<W0), the up/down counter 116 carries out the count-down operation, allowing the control voltage Vc to decrease so that the phase difference is made greater by the operation of the PLL circuit 111 resulting in a substantially constant phase difference corresponding to the pulse width W0 at a normal temperature.

Thus, according to the present embodiment, when a change in phase difference between the write set signal and the picture element clock signal due phase difference detection circuit, the phase shift signal generation circuit generates a phase shift signal that is supplied to the PLL circuit for compensating for the change in the phase difference. Therefore, it is possible for the multipoint synchronization optical writing apparatus to accurately position the scanning spots because the ambient temperature change does not so greatly influence the PLL circuit according to the present embodiment.

Figure 10:
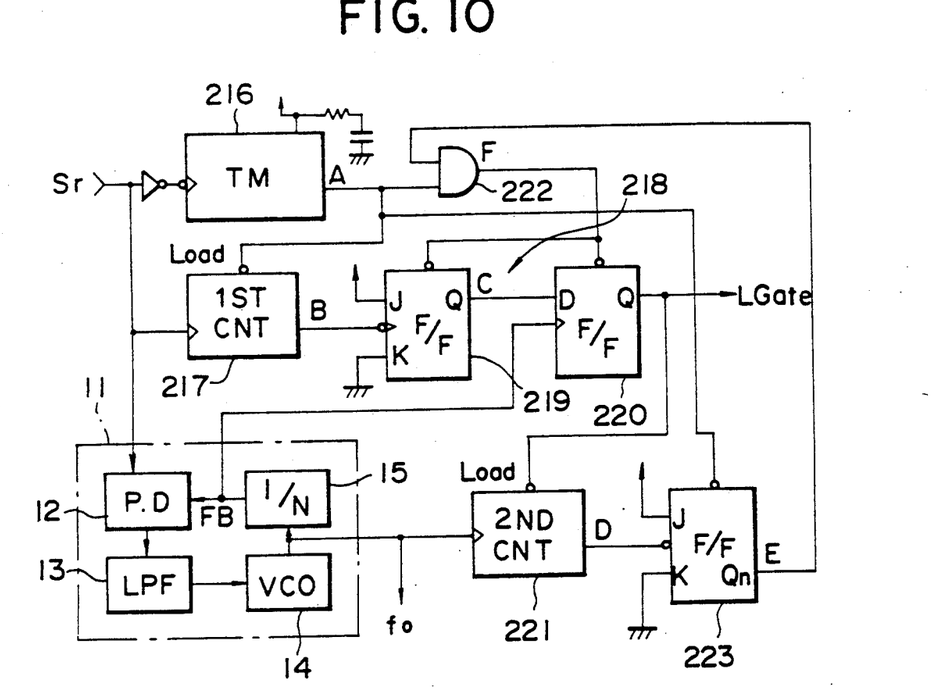
FIG. 10 is a block diagram showing a third embodiment of a multipoint synchronization optical writing apparatus according to the present invention.

Next, a description will be given of a third embodiment of a multipoint synchronization optical writing apparatus according to the present invention, with reference to FIGS. 10 and 11. In FIG. 10, those parts which are the same as those corresponding parts in FIG. 1 are designated by the same reference numerals, and a description thereof will be omitted, unless otherwise specified.

As shown in FIG. 10, there are provided a timer 216 and a first counter 217. The reference signal Sr is supplied to the timer 216. As indicated in FIG. 11, the timer 216 generates a gate signal A covering one scanning width of the writing beam P1 from the second light source 1 when the reference signal Sr is supplied, and this gate signal A is supplied to the first counter 217. The first counter 217 is loaded before the gate signal A is supplied from the timer 216, and counts the number of pulses of the reference signal Sr during an outputting of the gate signal A to the first counter 217. The first counter 217 counts a prescribed number of pulses of the reference signal Sr corresponding to the lockup time of the PLL circuit 11, then supplies a signal B to a write set signal generation circuit 218. The write set signal generation circuit 218, which is connected to several different points including the timer 216, the first counter 217 and the PLL circuit 11, is provided for generating a write set signal L/GATE that covers one scanning width of the writing beams P1 from the first semiconductor light source 1 in the main scanning direction, and this write set signal L/GATE is supplied to the drive circuit for driving the first semiconductor light source 1. The write set signal generation circuit 218 comprises a first JK flip-flop 219, a D flip-flop 220, a second counter 221, an AND gate 222, and a second JK flip-flop 223. The first JK flip-flop 219 is connected to an output of the first counter 217. A D input terminal of the D flip-flop 220 is connected to a Q output of the first JK flip-flop, and a clock input of the D flip-flop 220 is connected to an output of the divider 15 of the PLL circuit 11, and this D flip-flop 220 supplies the write set signal L/GATE from its Q output. The Q output of the D flip-flop 220 is connected to a LOAD input of the second counter 221, and this second counter 221 is enabled by the Q output of the D flip-flop 220 so that the second counter 221 counts the number of pulses of an oscillator output signal $f_o$ sent from the voltage controlled oscillator (VCO) 14 of the PLL circuit 11. One input of the AND gate 222 is connected to the output of the timer 216, the other input being connected to a Qn output of the second JK flip-flop 223. An input of the second JK flip-flop 223 is connected to an output of the second counter 221, and the second JK flip-flop 223 outputs a clear signal to the first JK flip-flop 219 as well as to the D flip-flop 220 through the AND gate 222.

Figure 11:
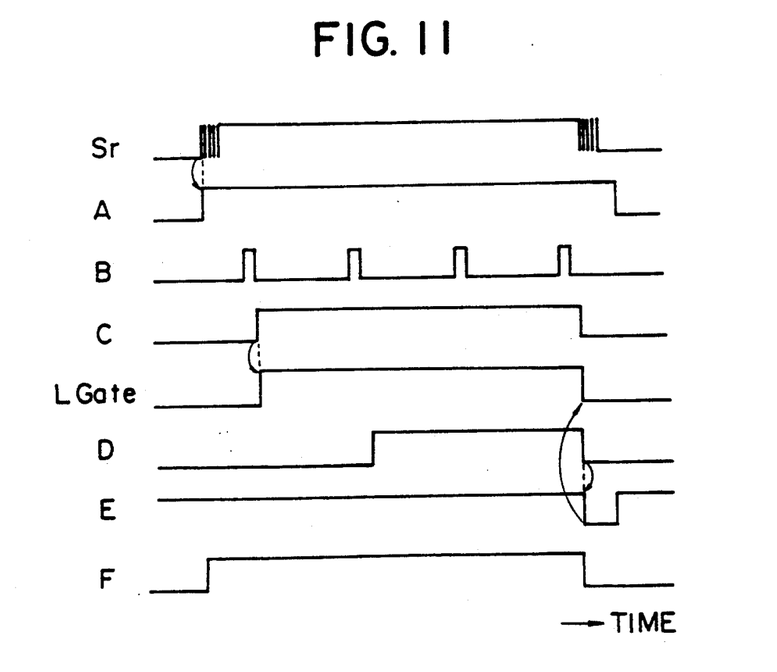
FIG. 11 is a timing chart for explaining an operation of the multipoint synchronization optical writing apparatus.

As shown in FIG. 11, once a first rise of the signal B from the first counter 17 occurs, a signal C from the first JK flip-flop 219 is changed into a high level from a low level, or the signal C rises. At this time, the write set signal L/GATE from the D flip-flop 220 first rises in synchronism with a feedback signal FB from the divider 15 of the PLL circuit 11. This feedback signal FB is obtained through a dividing of the pulse repetition rate of the oscillator output sign $f_o$ by n by the divider 14 and is fed from the divider 14 back to the phase detector 12. When the write set signal L/GATE is changed to a high level, the second counter 221 starts counting the number of pulses of the oscillator output signal $f_o$ corresponding to the quantity of data for one complete main scanning, in other words, a prescribed number of pulses of the picture element clock signal Wclk are determined by this counting by the second counter 221. After counting such a prescribed number of the pulses, the second counter 221 changes a signal D into a low level, and this change of the signal D causes a signal E outputted from the second JK flip-flop 223 to be changed into a low level from a high level. Then, the fall of the signal E makes the second JK flip-flop 223 to send a clear pulse to the first JK flip-flop 219 as well as to the D flip-flop 220. At this instant, the write set signal L/GATE from the D flip-flop 220 is changed from the high level to the low level.

Figure 12:
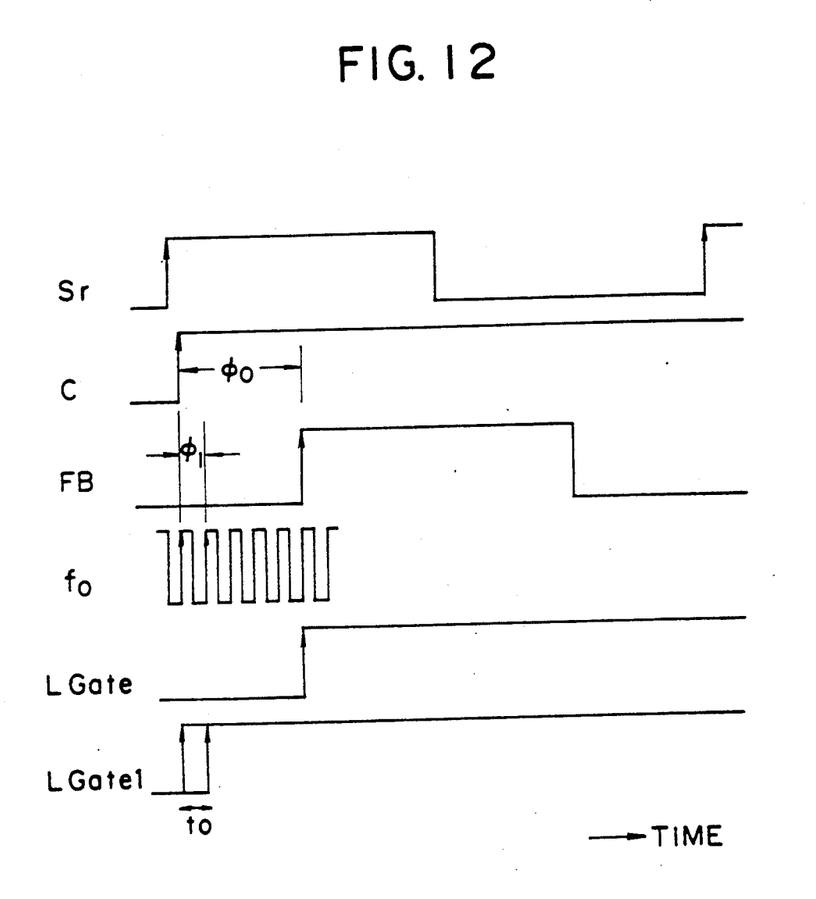
FIG. 12 is a partially enlarged view of the timing chart shown in FIG. 11.

FIG. 12 shows a partially enlarged view of the timing chart in FIG. 11. With a phase difference of $\pi/2$ from the phase of the reference signal Sr, the feedback signal FB has a locked phase. In this condition, the feedback signal FB and the oscillator output signal $f_o$ respectively have phase differences $\phi_0$ and $\phi_1$ with respect to the phase of the signal C, and these phase differences may be varied due to the ambient temperature change. The signal C from the first JK flip-flop 219 is a reference signal with which the write set signal L/GATE is generated in synchronism. With such a change in ambient temperature, the phase differences $\phi_0$ and $\phi_1$ change gradually until they reach steady-state phase differences $\phi_0$, and $\phi_1$, at that temperature. In a case where the write set signal L/GATE is generated in synchronism with the rise of the feedback signal FB, there may be, in a strict sense, a variation of the rise point of the write set signal L/GATE. But, this variation of the rise point is negligibly small when compared with the time period of one page recording. And, this feedback signal FB is an output of the divider 15 in which the pulse repetition rate of the oscillator output signal $f_o$ is divided by n. The relationship between the phase of the feedback signal FB and the phase of the oscillator output signal $f_o$ does not change substantially at all. Thus, using the feedback signal FB causes n misalignment of writing dot positions due to the ambient temperature change. In a case where a write set signal L/GATE1 is generated in synchronism directly with, for example, the oscillator output signal $f_o$, some undesired factors such as jittering or noises may cause the timing of generation of this write set signal L/GATE1 to vary significantly (it is supposed that $\phi_1$, is nearly equal to zero) by a time period $t_0$ corresponding to one period of the oscillator output signal $f_o$, which may produce a misalignment of writing dot positions.

Figure 13:
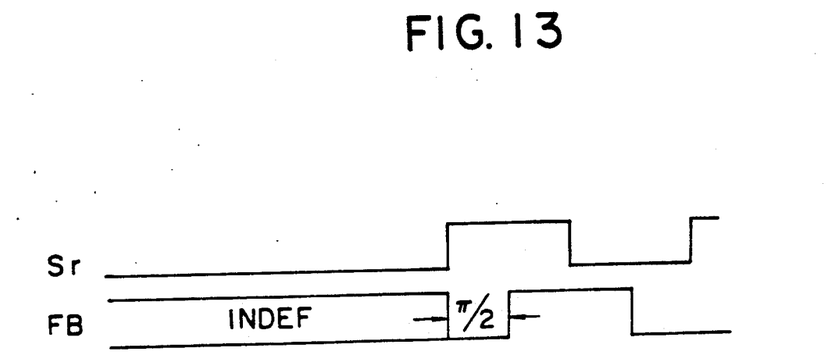
FIG. 13 is a timing chart for explaining a rise timing of a write set signal with respect to a reference signal in the third embodiment.

The reference signal Sr is usually generated intermittently, or the reference signal Sr is turned on (the high level) for writing regions and is soon turned off (the low level) for non-writing regions. In the present embodiment, however, the feedback signal FB from the divider 15 to the phase detector 12 is continuously supplied even when the reference signal Sr is at a low level, or in a turned-off state. But, the phase of the feedback signal FB is normally indefinite while n reference signal Sr is being supplied, as indicated in FIG. 13. And, as shown in FIG. 13, the feedback signal FB is reset to the low level when a rise of the reference signal Sr to a high level takes place. After a given number of pulses of the oscillator output signal $f_o$ equivalent to n/4 are counted, the feedback signal FB is changed to a high level (at this time, there is a phase difference of 90 deg. between the reference signal Sr and the feedback signal FB). Subsequently, the low level or the high level of the feedback signal FB repeatedly takes place each time a given number of pulses of the oscillator output signal $f_o$ equivalent to n/2 occur. The divider 15 in the present embodiment is constructed to carry out the above described function. Accordingly, a fluctuation or a ripple that often appears in the input voltage of the voltage controlled oscillator 14 when the reference signal Sr is intermittently turned on and off may be reduced remarkably, thereby allowing the lockup time of the PLL circuit 11 to be shortened.

Further, the present invention is not limited to these embodiments, but various variations and modifications ma be made without departing from the scope of the present invention.

What is claimed is:

1. A multipoint synchronization optical writing apparatus which carries out an optical writing through modulation of a writing beam from a first light source in accordance with image information, the modulation of the writing beam being made by a write set signal in synchronism with a picture element clock signal supplied based on a synchronizing beam from a second light source, said multipoint synchronization optical writing apparatus comprising:

reference signal generation means for generating a reference signal based on the synchronizing beam from the second light source, the reference signal covering the overall width of a main scanning made with the writing beam from the first light source;

a phase lock loop circuit for generating the picture element clock signal having a phase in synchronism with a phase of the reference signal sent from the reference signal generation means;

a phase difference detection circuit for detecting a change in a phase difference between the write set signal and the picture element clock signal sent from the phase lock loop circuit, said phase difference detection circuit generating a control signal having a voltage proportional to said change in said phase difference; and a reference signal processing circuit for varying a duty factor of the reference signal depending on the control signal supplied from the phase difference detection circuit, said reference signal processing circuit supplying the reference signal having the thus varied duty factor to the phase lock loop circuit.

2. An apparatus as claimed in claim 1, wherein said reference signal processing circuit supplies the reference signal having a smaller duty factor than a first duty factor at a normal temperature to the phase lock loop circuit when the phase difference detection circuit detects a greater phase difference than a first phase difference at a normal temperature, and said reference signal processing circuit supplies the reference signal having a greater duty factor than said first duty factor to the phase lock loop circuit when the phase difference detection circuit detects a smaller phase difference than said first phase difference.

3. An apparatus as claimed in claim 2, wherein said reference signal processing circuit comprises threshold varying means for varying a threshold voltage of the reference signal processing circuit depending on said change in said phase difference which is detected by the phase difference detection circuit.

4. An apparatus as claimed in claim 2, wherein said reference signal processing circuit comprises drive power varying means for varying a drive power for driving the second light source depending on said change in said phase difference which is detected by the phase difference detection circuit, said varied drive power allowing said duty factor of the reference signal to be determined by comparison with a fixed threshold voltage of the reference signal processing circuit.

5. A multipoint synchronization optical writing apparatus which carries out an optical writing through modulation of a writing beam from a first light source in accordance with image information, the modulation of the writing beam being made by a write set signal in synchronism with a picture element clock signal supplied based on a synchronizing beam from a second light source, said multipoint synchronization optical writing apparatus comprising:

reference signal generation means for generating a reference signal based on the synchronizing beam from the second light source, the reference signal covering the overall width of a main scanning made with the writing beam from the first light source;

a phase lock loop circuit for generating the picture element clock signal having a phase in synchronism with a phase of the reference signal sent from the reference signal generation means;

a phase difference detection circuit for detecting a change in a phase difference between the write set signal and the picture element clock signal sent from the phase lock loop circuit, said phase difference detection circuit comprising an up/down counter for counting the number of pulses of said picture element clock signal that is proportional to said change in said phase difference, said up/down counter supplying a first control signal indicative of said number of said pulses; and a phase shift signal generation circuit for generating a second control signal having a voltage in accordance with said first control signal supplied from the up/down counter of the phase difference detection circuit to the phase shift signal generation circuit, said phase shift signal generation circuit supplying said second control signal to the phase lock loop circuit.

6. An apparatus as claimed in claim 5, wherein said second control signal supplied from said phase shift signal generation circuit to the phase lock loop circuit constitutes a phase shift signal having an input offset voltage that is inputted to a voltage controlled oscillator of the phase lock loop circuit so that the phase lock loop circuit operates so as to reduce said change in said phase difference to an initial phase difference between the write set signal and the picture element clock signal.

7. An apparatus as claimed in claim 6, wherein said phase difference detection circuit comprises a phase detection circuit for detecting said change in said phase difference to generate a control signal indicative of a pulse width proportional to the phase difference between the write set signal and the picture element clock signal, said up/down counter carrying out either a count-up or a count-down depending on a change in said pulse width.

8. A multipoint synchronization optical writing apparatus which carries out an optical writing through modulation of a writing beam from a first light source in accordance with image information, the modulation of the writing beam being made by a write set signal in synchronism with a picture element clock signal supplied based on a synchronizing beam from a second light source, said multipoint synchronization optical writing apparatus comprising:

reference signal generation means for generating a reference signal based on the synchronizing beam from the second light source, the reference signal covering the overall width of a main scanning made with the writing beam from the first light source;

a phase lock loop circuit for generating the picture element clock signal having a phase in synchronism with a phase of the reference signal sent from the reference signal generation means, said phase lock loop circuit comprising a voltage controlled oscillator, a phase detector, a divider and a low pass filter;

a counter circuit for counting a predetermined number of pulses of the reference signal supplied from the reference signal generation means; and a write set signal generating circuit for generating a write set signal in synchronism with a generation of a feedback signal supplied from the divider of the phase lock loop circuit to the phase detector, said feedback signal having a divided pulse repetition rate that is determined from an output of th voltage controlled oscillator when the prescribed number of the pulses counted by the counter circuit is reached.

9. An apparatus as claimed in claim 8, wherein said predetermined number of the pulses counted by the counter circuit corresponds to a lockup time of the phase lock loop circuit required for the phase lock loop circuit to reach a phase locked state.

10. An apparatus as claimed in claim 9, wherein said divider continuously supplies a feedback signal to the phase detector regardless of whether the reference signal supplied from the reference signal generation means to the phase detector is generated or not, said feedback signal being turned from a low level to a high level when the reference signal is first generated so as to have a phase difference of $\pi/2$ between the feedback signal and the reference signal.

* * * * *